Feb. 23, 1954 P. D. BECKER 2,670,226
FASTENING DEVICE
Filed Jan. 13, 1951

INVENTOR:
PHILIP D. BECKER,
BY Robert E Ross
AGENT.

Patented Feb. 23, 1954

2,670,226

UNITED STATES PATENT OFFICE 2,670,226

FASTENING DEVICE

Philip D. Becker, Hingham, Mass., assignor to United-Carr Fastener Corporation, Cambridge, Mass., a corporation of Massachusetts Application January 13, 1951, Serial No. 205,952

7 Claims. (Cl. 287—20)

1

This invention relates generally to fastening devices, and has particular reference to a fastener for use in retaining a tubular member in an opening in a support.

The object of the invention is to provide a fastener for assembly into an opening in a support to receive and engage a tubular member inserted therein.

A further object of the invention is to provide a fastener having a body member with two series of tongues disposed thereabout, in which one series is adapted to engage the wall of an opening in a support, and the other series is adapted to enter the end of a tubular member inserted into the opening for engagement therewith.

A still further object of the invention is to provide a fastener of this type in which the tongues for engaging the wall of the support opening are provided with inclined portions for engagement by the end of an inserted tube to force said tongues into tighter engagement with the support.

Other objects of the invention will, in part, be obvious, and will, in part, appear hereinafter.

Figure 1:
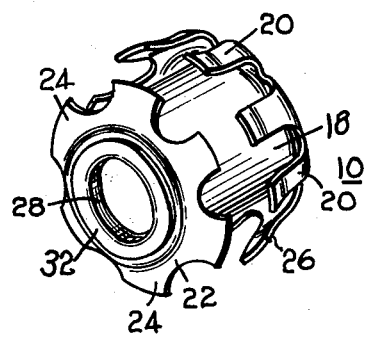
Fig. 1 is a perspective view of a fastener embodying the features of the invention.
Figure 2:
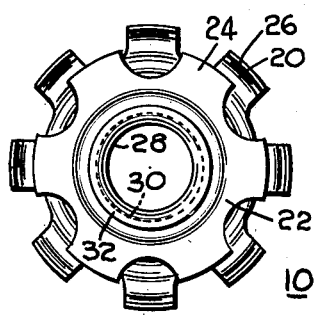
Fig. 2 is a top plan view of the fastener of Fig. 1.
Figure 3:
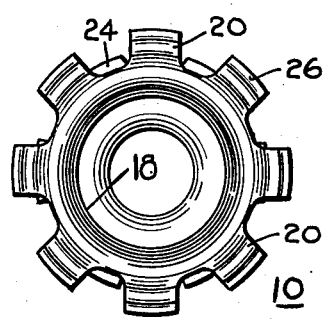
Fig. 3 is a bottom plan view of the fastener of Fig. 1.

Referring to the drawing, there is illustrated a fastener 10, which is adapted for assembly into an opening 12 in a support 14 to receive and engage the end of a tubular member 16 inserted into the opening.

The fastener 10 comprises generally a hollow body portion 18, a first series of support-engaging arms or tongues 20 disposed about the body at one end, and plate 22 disposed on the body at the other end, said plate having a second series of tube-engaging tongues or teeth 24 disposed thereon. The body 18 is preferably formed of sheet metal, and the tongues 20 of the first series are integral with one end thereof. The tongues 20 extend outwardly from the body and then are turned to extend away from the adjacent end alongside the body in spaced relation thereto, and terminate in end portions 26 which may be turned slightly outwardly for a purpose

2 to be hereinafter described. The end of the body opposite the series of tongues 20 is provided with a neck portion 28, and the plate 22, which has a central opening 30, is assembled onto the neck. To retain the plate in assembly with the body, the end of the neck is curled outwardly over the plate to form a retaining flange 32. The teeth 24 on the plate are inclined in relation to the axis of the body away from the adjacent end thereof to facilitate engagement of the tongues with the tubular member as described hereinafter.

Figure 4:
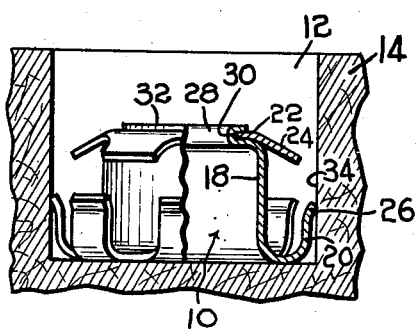
Fig. 4 is a view in elevation, partly in section, illustrating the fastening device of Fig. 1 assembled into an opening in a support.

To assemble the device, the fastener 10 is inserted into the opening 12 in the support so that the end of the body 18 having the support-engaging tongues 20 seats against the bottom of the opening (see Fig. 4). The dimensions of the fastener are preferably such that the end portions 26 of the tongues 20 engage the wall 34 of the opening during assembly, so that the tongues 20 are flexed slightly toward the body, and thereby frictionally engage the wall to retain the fastener in the opening during subsequent handling of the support 14 prior to assembly of the tubular member.

Figure 5:
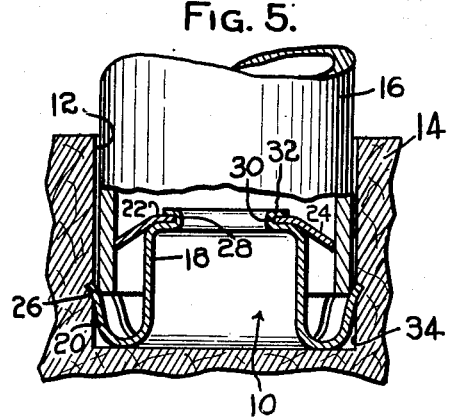
Fig. 5 is a view of the assembly of Fig. 4 after a tubular member has been inserted into the support opening.

To complete the assembly, the tubular member 16 is then inserted into the opening 12 so that the plate 22 passes into the bore of the tube. The dimensions of the plate 22 are such in relation to the internal dimensions of the tube that the teeth 24 must be flexed slightly downwardly to permit such entry, whereby the teeth are maintained in a state of flexure to frictionally engage the interior surface of the tube wall. As the tube is forced further downwardly, the end of the tube contacts the end portions 26 of the tongues 20, and forces them outwardly so that they dig into engagement with the wall 34 of the opening (see Fig. 5). Thus, after assembly, the tube is retained by the teeth 24 of the plate, and the fastener 10 is retained in the opening by the tongues 20 which have been forced into engagement with the support by the end of the tube.

In the illustrated embodiment, the tongues 20 of the fastener are designed for engagement with a support 14 made of wood or similar fibrous material. However, it is within the scope of the invention to provide tongues 20 which are adapted for engagement with a metal support member, in which case the shape of the tongues 20 will more nearly resemble the shape of the teeth 24 on the other end of the body.

Although it has been found economical to make the fastener of two assembled pieces, in some cases the fastener may be formed of a single piece of sheet metal with equally good results.

Since certain other obvious modifications may be made in the device without departing from the scope of the invention, it is intended that all matter contained herein be interpreted in an illustrative and not in a limiting sense.

I claim:

1. A fastening device for assembly into an opening in a supporting member to receive and engage a tubular member inserted into the opening, comprising a body member having a first series of support member engaging tongues disposed thereabout, the tongues of said first series extending outwardly in inclined relation to the axis of the body and terminating in free ends disposed in spaced relation to the body for digging into engagement with the wall of the supporting member in the opening, and a second series of tubular member engaging tongues joined to the body in longitudinal spaced relation to the first series of tongues, the tongues of said second series extending outwardly about the periphery of the body in inclined relation thereto for biting engagement with the interior surface of the tubular member, the free ends of the tongues of said second series being spaced from the body a lesser distance than the tongues of said first series.

2. A fastening device for assembly into an opening in a support to receive and engage a tubular member inserted into the opening, comprising a body member, a first series of tongues disposed about the body, the tongues of said first series extending outwardly from the body in inclined relation to the axis thereof and terminating in free ends disposed for biting engagement with the interior surface of the tubular member, and a second series of tongues joined to the body in longitudinal spaced relation to the first series, the tongues of said second series extending generally alongside the body in spaced relation thereto toward the plane of the first series and having free end portions which are inclined outwardly from the body for digging into engagement with the support in the opening therein, the free ends of the tongues of said second series being spaced further outwardly from the body than the tongues of said first series.

3. A fastening device for assembly into an opening in a support to receive and engage a tubular member inserted into the opening, comprising a body member, a first series of tongues disposed about the body at one end, the tongues of said first series extending outwardly from the body in inclined relation thereto away from the adjacent end to terminate in free ends for biting engagement with the interior surface of the tubing, and a second series of tongues joined to the other end of the body, the tongues of said second series extending alongside the body in radial spaced relation thereto toward said one end and terminating in outwardly inclined free end portions for digging into engagement with the support in the opening, the tongues of said second series being spaced a greater distance from the body than the free ends of the tongues of the first series, whereby when the fastener is assembled into the opening and a tubular member is inserted therein, the tongues of the first series enter the tubular member and engage the inner surface thereof and the end of the tubular member engages said outwardly inclined portions of the tongues of the second series to force the free ends thereon outwardly to dig into engagement with the support.

4. A fastening device for assembly into an opening in a support to receive and engage a tubular member inserted therein, comprising a hollow member inserted therein, comprising a hollow member inserted therein, comprising a hollow cylindrical sheet metal body, said body having a series of integral tongues formed at one end thereof, said tongues being curled back to extend alongside the body away from said end and in spaced relation to the body, and having end portions which are inclined outwardly away from the body for digging into engagement with the wall of the support opening, and a tube-engaging plate assembled onto the other end of the body, said plate having a series of outwardly extending tube-engaging teeth which are inclined slightly away from the adjacent end, said teeth terminating in free ends for digging into engagement with the interior surface of the tubular member, said free ends being disposed a lesser distance from the body than the end portions of the integral tongues on the body.

5. A fastening device for assembly into an opening in a support to receive and engage a tubular member inserted therein, said device comprising a body having a series of spring tongues extending from one end alongside the body in spaced relation thereto generally toward the other end and terminating in outwardly inclined end portions, and a plate assembled onto the other end of the body, said plate having a series of relatively rigid radially extending tongues disposed therein, which are inclined toward said one end of the body.

6. A fastener assembly, comprising a support having an opening, a tubular member having an end disposed in the opening and a fastener retaining the tube in the opening, said fastener comprising a medial portion extending into the inside of the tube in frictional engagement therewith, and means outside the tube in engagement with the wall of the opening, said medial portion and said means being joined by means extending under the end of the wall of the tube.

7. A fastener assembly, comprising a support having an opening, a tubular member having an end disposed in the opening, and a fastener retaining the tube in the opening, said fastener comprising a medial portion extending into the end of the tube and having means therein in frictional engagement with the inside of the tube, and arms joined to the medial portion which extend upwardly under the end of the tube, said arms having end portions forced outwardly into engagement with the wall of the opening by the tube.

PHILIP D. BECKER.

References Cited in the file of this patent

UNITED STATES PATENTS

| Number | Name | Date |
| --- | --- | --- |
| 1,083,697 | Neptune | Jan. 6, 1914 |
| 1,258,647 | Bowers | Mar. 12, 1918 |
| 1,817,775 | Sipe | Aug. 4, 1931 |
| 1,909,353 | Hughes | May 16, 1933 |
| 1,987,035 | Tideman | Jan. 8, 1935 |
| 2,034,051 | Lipp | Mar. 17, 1936 |
| 2,133,871 | Reed | Oct. 18, 1938 |
| 2,529,219 | Kost | Nov. 7, 1950 |